(12) United States Patent
Lazzarini et al.

(10) Patent No.: US 12,604,916 B2
(45) Date of Patent: Apr. 21, 2026

(54) MACHINE AND METHOD FOR MAKING ICE CREAM

(71) Applicant: ALI GROUP S.R.L.—CARPIGIANI, Cernusco sul Naviglio (IT)

(72) Inventors: Roberto Lazzarini, Reggio Emilia (IT); Federico Tassi, Bologna (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 534 days.

(21) Appl. No.: 18/155,968

(22) Filed: Jan. 18, 2023

(65) Prior Publication Data

US 2023/0232859 A1    Jul. 27, 2023

(30) Foreign Application Priority Data

Jan. 21, 2022    (IT) ........................ 102022000001016

(51) Int. Cl.
*A23G 9/22* (2006.01)
*A23G 9/12* (2006.01)
*A23G 9/28* (2006.01)

(52) U.S. Cl.
CPC .............. *A23G 9/227* (2013.01); *A23G 9/12* (2013.01); *A23G 9/282* (2013.01); *A23G 2200/12* (2013.01)

(58) Field of Classification Search
CPC . A23G 9/227; A23G 9/22; A23G 9/12; A23G 9/281; A23G 9/282; A23G 9/283; A23G 2200/12; F25D 25/028
See application file for complete search history.

(56) References Cited

U.S. PATENT DOCUMENTS

| | | | | |
|---|---|---|---|---|
| 3,517,524 | A | * 6/1970 | Fiedler | .................... A23G 9/281 |
| | | | | 62/135 |
| 2007/0110872 | A1 | 5/2007 | Gerber | |
| 2016/0174593 | A1* | 6/2016 | Cocchi | ..................... A23G 9/12 |
| | | | | 62/132 |
| 2017/0332659 | A1* | 11/2017 | Cocchi | ..................... A23G 9/12 |

FOREIGN PATENT DOCUMENTS

| | | |
|---|---|---|
| EP | 2095720 A3 | 3/2012 |
| EP | 3062629 A1 | 9/2016 |
| EP | 3095332 A1 | 11/2016 |
| EP | 3248468 A1 | 11/2017 |
| EP | 3834621 A1 | 6/2021 |

OTHER PUBLICATIONS

Italian Search Report dated Aug. 17, 2022 from counterpart Italian Patent Application No. 102022000001016.

* cited by examiner

*Primary Examiner* — Joseph F Trpisovsky
(74) *Attorney, Agent, or Firm* — SHUTTLEWORTH & INGERSOLL, PLC; Timothy J. Klima

(57) ABSTRACT

A machine for making ice cream includes a production unit including a processing container. The machine also includes a thermal treatment system associated with the processing container and a dispenser operatively connected to the processing container to allow extracting an ice cream type product from the machine. The machine also includes a supporting body fitted under the dispenser and a supporting element connected removably to the supporting body. The supporting element includes a receiving cavity, configured to reversibly house a container used to contain the ice cream type product delivered by the dispenser, and cooling means configured to cool the supporting element.

20 Claims, 4 Drawing Sheets

BASE MIXTURE

ICE CREAM

MACHINE AND METHOD FOR MAKING ICE CREAM

This application claims priority to Italian Patent Application 102022000001016 filed Jan. 21, 2022, the entirety of which is incorporated by reference herein.

BACKGROUND OF THE INVENTION

This invention relates to a machine for making ice cream and to method for making ice cream.

As is known, food safety and hygiene in the food industry are particularly important issues.

More specifically, in the industry concerned, infectious agents such as *Salmonella* and *Listeria monocytogenes* may thrive under certain conditions.

In particular, under certain conditions, these species of bacteria can proliferate and spread rapidly by cross contamination even at low temperatures.

A typical example of this context is the process for producing ice cream and the machines used for processing ice cream.

In particular, it has been found that every time the base mixture comes into contact with any external item (containers, tubs, serving utensils), the risk of product contamination increases, which, in effect, means that the overall food safety of the ice cream making process is reduced.

In passing from the dispensing machine, where the ice cream is refrigerated and stored at a low temperature, to the container which is, instead, at ambient temperature, the ice cream undergoes a thermal shock which has a negative affect on its quality and wholesomeness.

To date, to overcome this drawback, the prior art uses containers which can be placed in a freezer before the ice cream is dispensed into them. More in detail, these containers are kept in the freezer for a predetermined length of time and taken out only when the ice cream is dispensed into them, so as to reduce the risk of contamination that would be caused by the ice cream coming into contact with a container at ambient temperature. Containers of this kind also have disadvantages, however.

In particular, the temperature of the container cannot be controlled precisely and, because of that, when the ice cream is dispensed into it, there is the risk of ice crystals spoiling its creamy texture and, in some cases, even its food properties.

This has given rise to the need to improve food safety in order to provide ice cream which is particularly safe, does not have any residual food risk for consumers and has the right food properties.

In this context, it is therefore essential to increase the food safety of the ice cream making process and to provide an operating method which is safe, that is, which allows the potential risks of contamination to be eliminated, thus guaranteeing a safe end product.

SUMMARY OF THE INVENTION

The aim of this invention is to provide a machine for making ice cream and a method for making ice cream to meet the above-mentioned needs.

Another aim of this invention is to provide a machine for making ice cream which allows reducing the potential risks of product contamination and which does not alter the food properties of the product.

A further aim of this invention is to provide a method for making ice cream which simplifies operations, reducing the handling of the ingredients.

According to the invention, these aims are achieved by a machine for making ice cream and a method for making ice cream comprising the technical features set out in one or more of the appended claims.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a non-limiting example embodiment of the invention, and in which:

DESCRIPTION OF THE PREFERRED EMBODIMENTS

Figure 1:
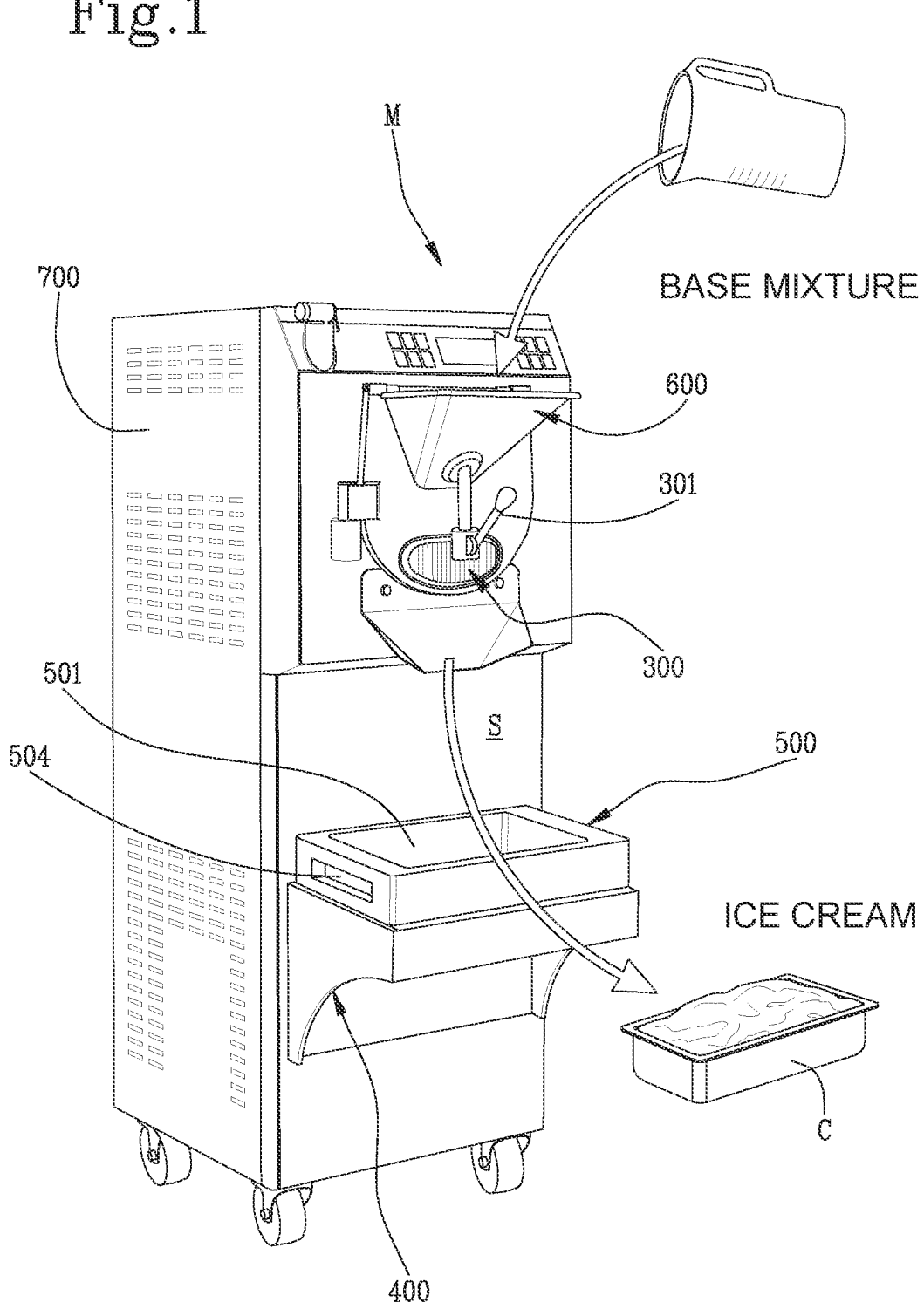
FIG. 1 shows a perspective view of an ice cream machine according to the invention.

With reference to the accompanying drawings, the letter M denotes a machine for making ice cream, adapted to allow making ice cream (preferably artisan gelato) from a liquid or semi-liquid product.

The term "liquid or semi-liquid product" is used to mean a product of the sector of ice cream, bakery and confectionery and the like, constituting a base mixture (in liquid, semi-liquid or powder form) with other liquid products of any nature (e.g. water, syrups) added, if necessary.

In the context of the invention, by "ice cream" or "ice cream type product" is meant a food preparation (such as, by way of non-limiting example: gelato, soft serve ice cream, granita, sorbet, shake, yogurt, frozen desserts, chilled creams) derived from the liquid or semi-liquid base product. Such a food preparation is usually based on sugars, milk and milk-derived products to which fruit, aromatics or other ingredients are added to obtain different flavors.

As shown in the accompanying drawings, the machine M comprises a frame 700, substantially in the shape of a parallelepiped, which houses a production unit 100 comprising a processing container 101 for processing a liquid or semi-liquid product and defining a processing chamber 102.

The machine M also comprises a stirrer 103 that rotates inside the processing chamber 102 and is configured to mix the liquid or semi-liquid product inside the processing container 101.

Preferably, the stirrer 103 is associated with a motor 104 configured to drive the stirrer 103 in rotation inside the processing container 101 so as to mix the liquid or semi-liquid product.

The stirrer 103 also acts as a scraper which removes the layers of ice from the inside walls of the processing chamber 102.

According to an aspect of the invention, the machine M also comprises a thermal treatment system 200 associated with the processing container 101 and configured to cool the processing chamber 102 to obtain an ice cream type product, as described in detail below.

Preferably, the thermal treatment system 200 operates according to a thermodynamic cycle and comprises at least one heat exchanger 201 configured to exchange heat with the processing container 101.

Still more preferably, the thermal treatment system 200 also comprises a further heat exchanger, a compressor and a pressure reducing element.

It should be noted that the heat exchanger 201, the further heat exchanger, the compressor and the pressure reducing element define a circuit containing a heat carrier fluid.

According to an aspect of the invention, the liquid or semi-liquid product is placed in the processing container 101 to be thermally treated and then dispensed.

Preferably, the thermal treatment system 200 is run in cooling mode to cool the liquid or semi-liquid product inside the processing chamber 102 and, at the same time, to make an ice cream type product inside the processing chamber 102. In this situation, the stirrer 103 is started so that the ice cream type product incorporates air and is mixed to a smooth, creamy consistency.

According to an aspect of this disclosure, as shown in FIG. 1, the machine M comprises a hopper 600 that communicates with the processing chamber 102 in order to load the liquid or semi-liquid product into the processing chamber 102.

The hopper 600 is accessible to an operator from the outside so that the liquid or semi-liquid product can be poured into the processing chamber 102.

Preferably, the hopper is made on an outside wall S of the machine M.

Still more preferably, the hopper 600 is made on an upper portion of the outside wall S.

As illustrated in the accompanying drawings, the machine M also comprises a dispenser 300 connected, for example by a conduit, to the processing container 101 of the liquid or semi-liquid product to allow the ice cream type product to be extracted from the machine M.

Preferably, the dispenser 300 is operable by an operator using a lever 301 connected to a shutter (not illustrated) so as to allow or prevent the passage of the ice cream type product along the conduit to the outside of the machine M.

The dispenser 300 is installed on the outside wall S of the machine M, under the hopper 600, at a convenient height making it easily accessible to the operator.

Figure 2:
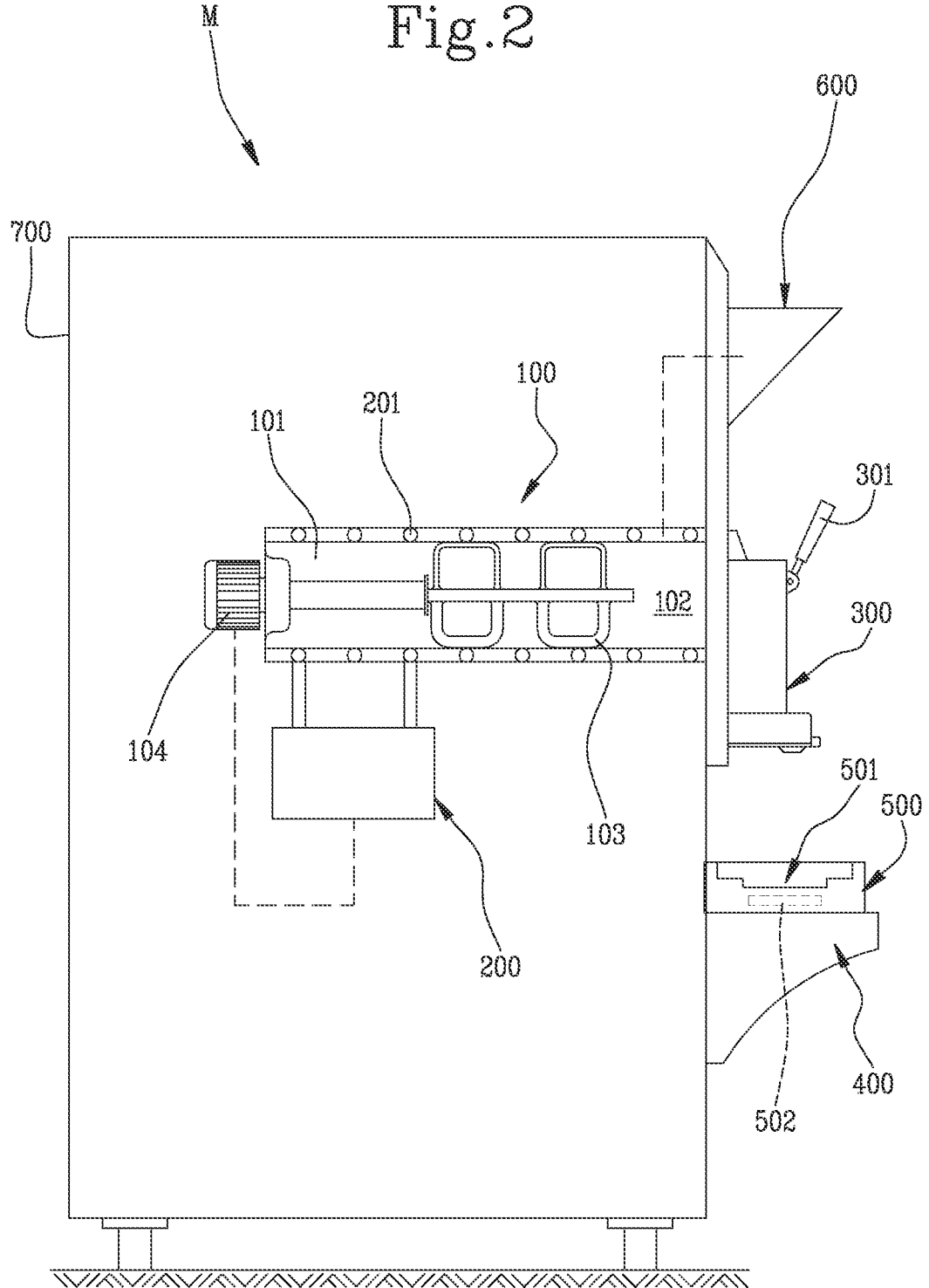
FIG. 2 shows a cross section of the machine of FIG. 1.

As shown in FIGS. 1 and 2, the machine M also comprises a supporting body 400 applied, preferably in cantilever fashion, to the outside wall S, under the dispenser 300.

In the preferred embodiment, the supporting body 400 is made in the form of a bracket or shelf.

According to an aspect of this disclosure, the machine M also comprises a supporting element 500 connected removably to the supporting body 400.

Preferably, the supporting element 500 comprises fixing means configured to couple the supporting element 500 reversibly to the supporting body 400.

Figure 3A:
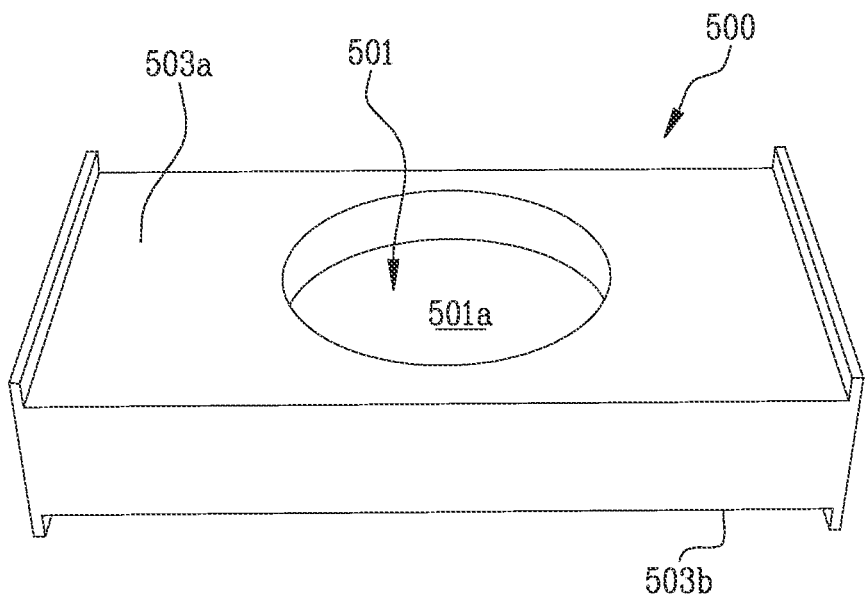
FIGS. 3A and 3B show perspective views of a supporting element included in the machine.
Figure 3B:
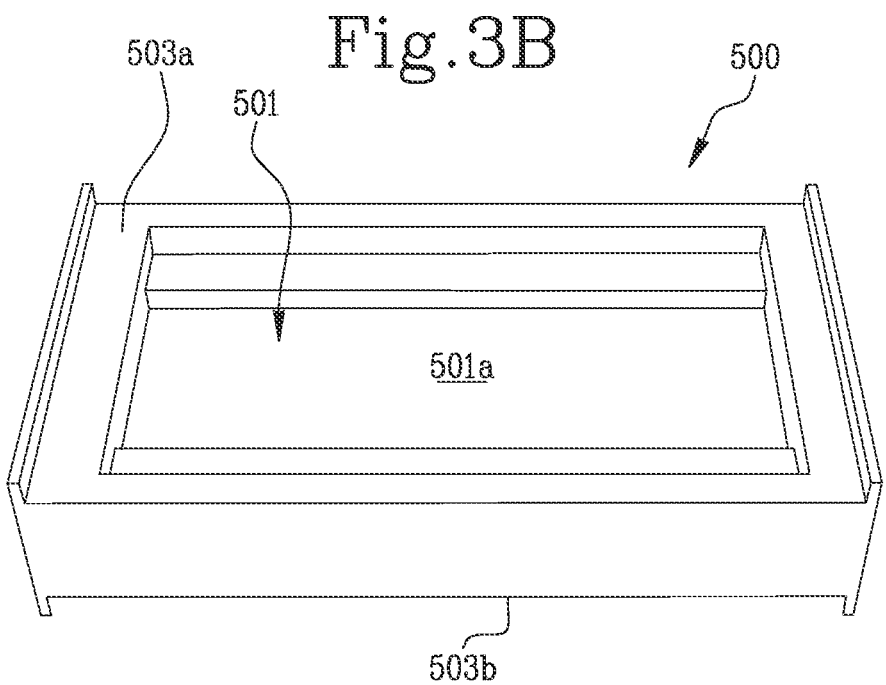

As shown in FIGS. 3A and 3B, the supporting element 500 comprises a receiving cavity 501, configured for reversibly housing a container C used to contain the ice cream type product delivered by the dispenser 300.

Preferably, according to an aspect, the receiving cavity 501 is, in cross section, substantially circular, for example adapted to receive cylindrical bucket-like containers C, or rectangular, for example adapted to receive rectangular tub-like containers C.

In a possible embodiment, the supporting element 500 may also comprise a further receiving cavity for reversibly housing a container C used to contain the ice cream type product delivered by the dispenser 300.

In this embodiment, the further receiving cavity is different in shape and/or size from the receiving cavity 501 so as to be able to receive a different container C. In this embodiment, the supporting element 500 is applied to the supporting body 400 by connecting means configured to allow the supporting element 500 to slide on the supporting body 400. In this situation, by sliding the supporting element 500, the receiving cavity 501 or, alternatively, the further receiving cavity can be placed under the dispenser 300, depending on which container C is to be filled.

Advantageously, the fact that the supporting element 500 may comprise two receiving seats 501 which differ in shape and/or size allows dispensing the ice cream type product in different containers C without having to provide, for each container C, a supporting element 500 with a specially made receiving seat 501.

Alternatively, the supporting element 500 may comprise a first and a second receiving seat, one on each of the opposite walls of the supporting element 500, and differing in shape and/or size. In this situation, the supporting element 500 is applied to the supporting body 400 by connecting means configured to allow applying the supporting element 500 to the supporting body 400 according to a first assembly configuration in which the first receiving cavity is located under the dispenser 300, or according to a second assembly configuration in which the second receiving cavity is located under the dispenser 300. In this embodiment, depending on the container C to be filled, the supporting element 500 is mounted in one configuration or the other.

In the preferred embodiment, the supporting element 500 comprises a substantially box-shaped body having a first surface 503a, where the receiving cavity 501 is made, and a second surface 503b opposite the first surface 503a.

According to an aspect of this disclosure, the supporting element 500 comprises a pair of gripping elements 504, located opposite each other and adapted to be gripped by an operator to remove or place the supporting element 500 from or on the supporting body 400.

The gripping elements 504 are preferably selectable from: handles, recesses, knobs.

According to an aspect of this disclosure, the supporting element 500 also comprises cooling means 502 configured to cool the supporting element 500.

More specifically, the cooling means 502 are configured to cool the receiving seat 501 and the container C placed therein.

In other words, the cooling means 502 are configured to cool the supporting element 500 so that when the container C is placed in the receiving seat 501, it too is cooled and kept at a predetermined temperature the whole time the product is being dispensed.

Preferably, the cooling means 502 are configured to keep the supporting element 500 at a temperature substantially equal to the temperature of the ice cream type product delivered by the dispenser 300.

Figure 4A:
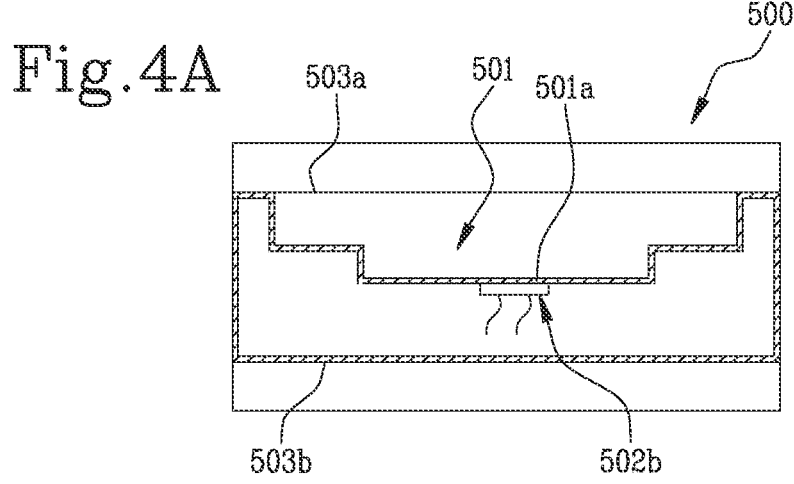
FIGS. 4A-4C show embodiments of cooling means applied to the supporting element.
Figure 4B:
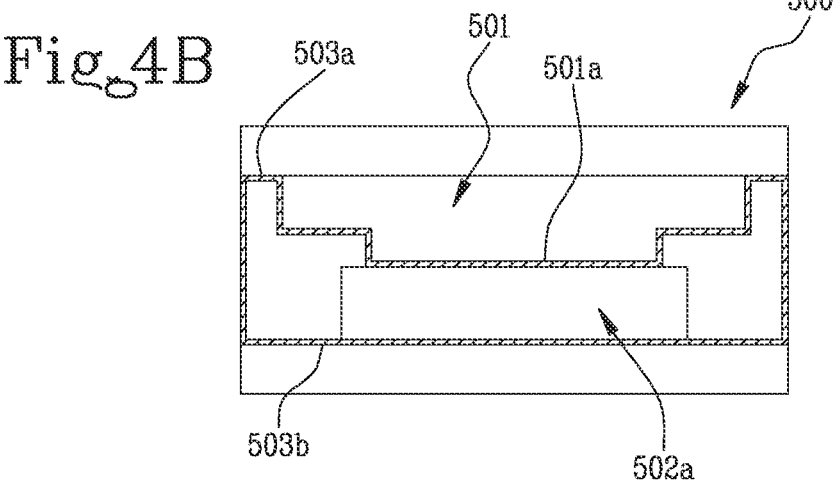
Figure 4C:
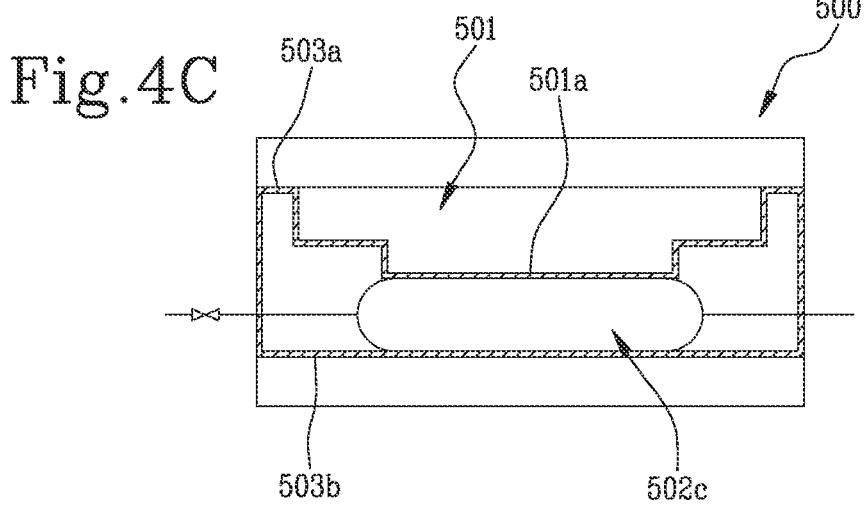

Preferably, the cooling means 502 are interposed between the first and the second surface 503a, 503b (FIGS. 4A-4C).

Still more preferably, the cooling means 502 are interposed between a base wall 501a of the receiving cavity 501 and the second surface 503b of the box-shaped body of the supporting element 500.

In use, the liquid or semi-liquid product is loaded into the processing chamber 102 through the hopper 600. After that, the thermal treatment system 200 is started so as cool the liquid or semi-liquid product inside the processing chamber 102.

Preferably, the liquid or semi-liquid product is cooled to a temperature of between −15° C. and 0° C. (more preferably between −15° C. and −5° C., and still more preferably between −12° C. and −7° C.) so as to make an optimum quality ice cream type product.

Once the ice cream type product has been obtained, a quantity or portion of it can be extracted from the processing chamber 102 through the dispenser 300.

To dispense the ice cream product, the operator places the supporting element 500 on the supporting body 400.

According to an aspect of this disclosure, the machine M comprises a plurality of supporting elements 500 interchangeably connectable to the supporting body 400. Each supporting element 500 of the plurality has a receiving cavity 501 differing in cross sectional shape and/or size from the receiving cavities 501 of the other supporting elements 500 of the plurality. In this situation, depending on the container C to be filled, the operator places the supporting element 500 having the receiving cavity 501 of the required shape.

Specifically, if the ice cream type product needs to be dispensed in a rectangular tub, the supporting element 500 to be mounted on the supporting body 400 will have a rectangular receiving seat 501. If the ice cream type product needs to be dispensed in a cylindrical bucket-like container, on the other hand, the supporting element 500 to be mounted on the supporting body 400 will have a circular receiving seat 501.

After mounting the supporting element 500, a container C is placed in the receiving cavity 501 and the cooling means 502 are started in order to cool the supporting element 500 and the container C to a temperature approximately equal to that of the ice cream type product being dispensed.

In effect, the cooling means are configured to cool the supporting element 500 (hence the container C placed therein) to a temperature substantially equal to that of the ice cream dispensed.

In this situation, when the ice cream is dispensed into the container C, it does not undergo any thermal shock and keeps its food properties and wholesomeness.

In other words, the cooling means 502 cool the container C so that the moment the ice cream type product is dispensed and comes into contact with the container C, it does not undergo a thermal shock which can alter its quality and/or consistency, in particular in the proximity of the walls of the container C.

In the embodiment shown in FIG. 4B, the cooling means 502 comprise a tank 502*a* containing refrigerant fluid.

According to an aspect, the tank 502*a* is operatively connected to a refrigerant fluid distribution unit to make the refrigerant fluid circulate to and from the tank 502*a*.

Preferably, according to this aspect, the tank 502*a* is provided with at least one inlet and one outlet so that it can be connected to the refrigerant fluid distribution unit.

According to another aspect, the tank 502*a* is closed and is cooled externally, for example by a refrigerating unit.

Alternatively, as shown in FIG. 4A, the cooling means 502 comprise at least one Peltier cell 502*b*.

Preferably, the Peltier cell 502*b* is inserted between the first and the second surface 503*a*, 503*b* of the box-shaped body of the supporting element 500 and is connected to a direct current generator mounted in the machine M.

Still more preferably, the heat-absorbing plate of the Peltier cell 502*b* is applied to the first surface 503*a* of the box-shaped body of the supporting element 500 or to the base wall of the receiving seat 501, while the heat-emitting plate of the Peltier cell 502*b* is applied to the second surface 503*b* of the box-shaped body of the supporting element 500 so as to cool the container C into which the ice cream type product is dispensed.

In another possible embodiment, shown in FIG. 4C, the cooling means 502 comprise a heat exchanger 502*c*.

Preferably, the heat exchanger 502*c* is operatively connected to the thermal treatment system 200 of the machine M so as to cool the container C into which the ice cream type product is dispensed.

Alternatively, the heat exchanger 502*c* may be operatively connected to a cooling unit outside the machine M.

Advantageously, the presence of the cooling means 502 allows bringing the container C to a predetermined temperature, preferably substantially equal to the temperature of the ice cream type product dispensed from the machine M, thereby preventing (or in any case drastically reducing) the problem of food contamination.

Also an object of this invention is a method for making ice cream.

The method comprises a step of providing a machine M according to what is described in the foregoing and a step of placing a liquid or semi-liquid product in the processing chamber 102. Preferably, the step of placing the liquid or semi-liquid product is carried out by loading the liquid or semi-liquid product through the hopper 600 (FIG. 1).

Next, the method comprises a step of setting the thermal treatment system 200 in operation for a predetermined length of time so as to thermally treat the liquid or semi-liquid product inside the processing chamber 102.

In the preferred embodiment, the step of setting the thermal treatment system in operation comprises a sub-step of cooling the liquid or semi-liquid product in the processing chamber 102.

In the preferred embodiment, during the sub-step of cooling, the method comprises a step of starting the stirrer 103 so as to mix and cool the liquid or semi-liquid product to a soft, creamy consistency, thus obtaining a true gelato product.

The method also comprises a step of connecting the supporting element 500 to the supporting body 400.

Preferably, the method comprises, before the step of connecting, a step of selecting a supporting element 500 from the plurality of supporting elements 500 based on the type of container C to be used.

In the preferred embodiment, the step of connecting comprises a sub-step of positioning the supporting element 500 in such a way that the receiving seat 501 faces the dispenser 300.

Next, the method comprises a step of placing a container C in the receiving cavity 501 of the supporting element 500.

The method also comprises a step of cooling the supporting element 500 through the cooling means 502 and a step of extracting at least one portion of the ice cream type product from the processing chamber 102 through the dispenser 300.

The invention achieves the preset aims overcoming the drawbacks of the prior art.

More specifically, this invention reduces the risk of contaminating the product.

This invention improves the overall food safety of the process of making, dispensing and storing the ice cream.

What is claimed is:

1. A machine for making ice cream, comprising:

a production unit comprising a processing container for processing a liquid or semi-liquid product and defining a processing chamber;

a stirrer that rotates inside the processing chamber and is configured to stir the liquid or semi-liquid product inside the processing container;

a thermal treatment system operatively connected with the processing container and configured to cool the processing chamber to obtain an ice cream type product;

a dispenser mounted on an outside wall of the machine and operatively connected to the processing container to allow the ice cream type product to be extracted from the machine;

a supporting body applied in cantilever fashion to the outside wall under the dispenser;

at least one supporting element, removably connected to the supporting body, the at least one supporting element comprising:

a receiving cavity, configured to reversibly house a product container used to contain the ice cream type product delivered by the dispenser;

a cooling device configured to cool the at least one supporting element.

2. The machine according to claim 1, wherein the receiving cavity has, in cross section, a substantially circular shape or a substantially rectangular shape.

3. The machine according to claim 1, wherein the at least one supporting element comprises a box-shaped body having a first surface, in which the receiving cavity is positioned, and a second surface opposite the first surface.

4. The machine according to claim 3, wherein the cooling device is interposed between the first surface and the second surface, the cooling device being interposed between a base wall of the receiving cavity and the second surface of the box-shaped body of the at least one supporting element.

5. The machine according to claim 1, wherein the cooling device is configured to keep the at least one supporting element at a temperature substantially equal to a temperature of the ice cream type product delivered by the dispensing device.

6. The machine according to claim 1, wherein the cooling device comprises a tank containing refrigerant fluid.

7. The machine according to claim 1, wherein the cooling device comprises at least one Peltier cell.

8. The machine according to claim 1, wherein the cooling device comprises a heat exchanger, the heat exchanger being operatively connected to the thermal treatment system.

9. The machine according to claim 1, wherein the at least one supporting element comprises a pair of gripping elements, located opposite each other and adapted to be gripped by an operator to remove or place the at least one supporting element from or on the supporting body, the gripping elements being selectable from: handles, recesses, knobs.

10. The machine according to claim 1, and further comprising a hopper that communicates with the processing chamber, the hopper being accessible to an operator from outside the machine to pour the liquid or semi-liquid product into the processing chamber.

11. The machine according to claim 1, wherein the thermal treatment system operates according to a thermodynamic cycle and comprises at least one heat exchanger configured to exchange heat with the processing container.

12. The machine according to claim 1, wherein the at least one supporting element comprises a plurality of supporting elements adapted to be coupled interchangeably to the supporting body, each of the plurality of supporting elements having a receiving cavity differing in cross sectional shape and/or size from the receiving cavities of the others of the plurality of supporting elements.

13. A method for making ice cream, comprising the following steps:

providing a machine for making ice cream, comprising:

a production unit comprising a processing container for processing a liquid or semi-liquid product and defining a processing chamber;

a stirrer that rotates inside the processing chamber and is configured to stir the liquid or semi-liquid product inside the processing container;

a thermal treatment system operatively connected with the processing container and configured to cool the processing chamber to obtain an ice cream type product;

a dispenser mounted on an outside wall of the machine and operatively connected to the processing container to allow the ice cream type product to be extracted from the machine;

a supporting body applied in cantilever fashion to the outside wall under the dispenser;

at least one supporting element, removably connected to the supporting body, the at least one supporting element comprising:

a receiving cavity, configured to reversibly house a product container used to contain the ice cream type product delivered by the dispenser;

a cooling device configured to cool the at least one supporting element;

placing the liquid or semi-liquid product in the processing chamber;

setting the thermal treatment system in operation for a predetermined length of time and setting the stirrer in rotation to thermally treat the liquid or semi-liquid product in the processing chamber;

connecting the at least one supporting element to the supporting body;

placing the product container in the receiving cavity;

cooling the at least one supporting element through the cooling device;

extracting at least one portion of the ice cream type product from the processing chamber through the dispenser.

14. The method according to claim 13, and further comprising:

providing that the at least one supporting element includes a plurality of supporting elements, and before the step of connecting, a step of selecting one supporting element to be connected to the supporting body from the plurality of supporting elements based on a type of the product container to be used.

15. The method according to claim 13, and further comprising providing that the cooling device is configured to keep the at least one supporting element at a temperature substantially equal to a temperature of the ice cream type product delivered by the dispensing device.

16. The method according to claim 13, and further comprising providing that the cooling device comprises a tank containing refrigerant fluid.

17. The method according to claim 13, and further comprising providing that the cooling device comprises at least one Peltier cell.

18. The method according to claim 13, and further comprising providing that the cooling device comprises a heat exchanger, the heat exchanger being operatively connected to the thermal treatment system.

19. The method according to claim 13, and further comprising providing that the at least one supporting element comprises a box-shaped body having a first surface, in which the receiving cavity is positioned, and a second surface opposite the first surface.

20. The method according to claim 19, and further comprising providing that the cooling device is interposed between the first surface and the second surface, the cooling device being interposed between a base wall of the receiving cavity and the second surface of the box-shaped body of the at least one supporting element.

\* \* \* \* \*